Figure 1:
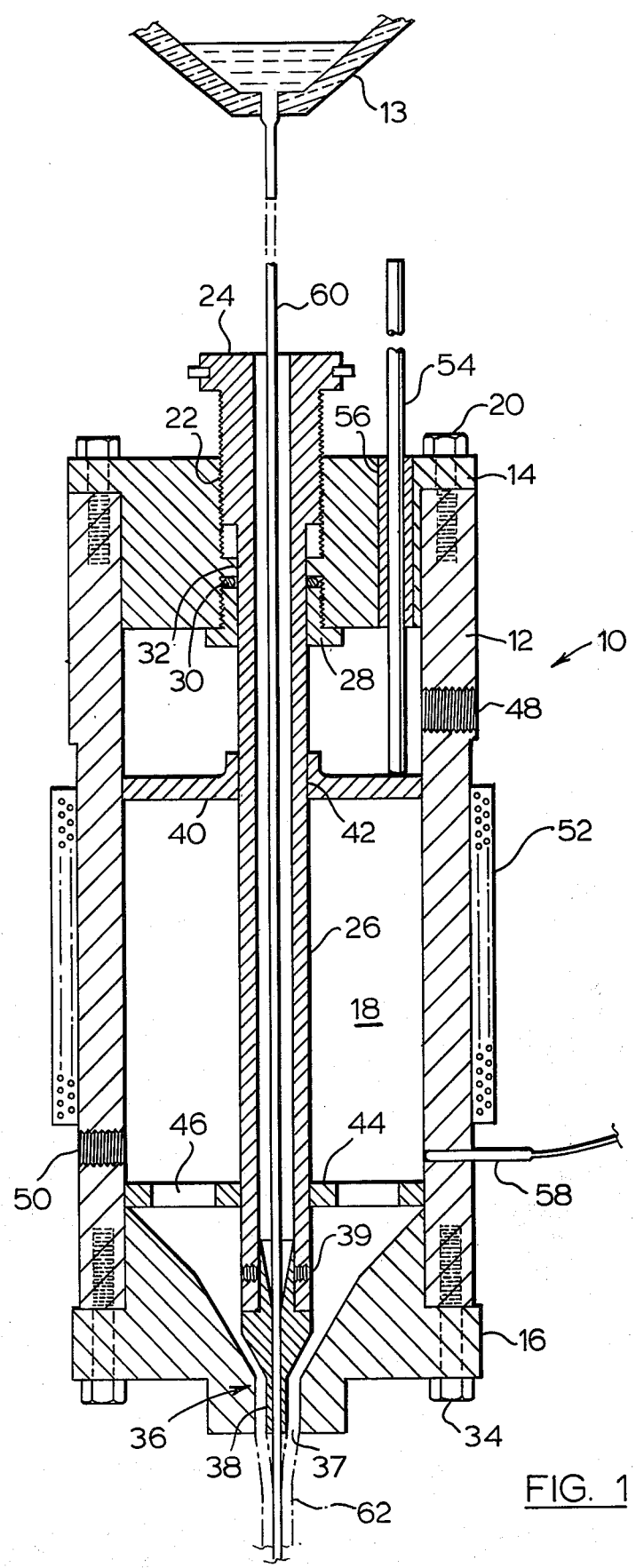

United States Patent [19]
Iyengar

[11] 3,960,530
[45] June 1, 1976

[54] METHOD OF COATING A GLASS FIBER FILAMENT

[75] Inventor: Rama Iyengar, Dollard des Ormeaux, Canada

[73] Assignee: Northern Electric Company Limited, Montreal, Canada

[22] Filed: July 29, 1975

[21] Appl. No.: 599,996

[52] U.S. Cl. ............................. 65/3 C; 65/11 W; 65/121; 118/405; 427/169
[51] Int. Cl.² ........................................ C03C 25/02
[58] Field of Search .................... 118/404, 405, 48; 65/3 C, 3 A, 11 W, 121; 427/169

[56] References Cited
UNITED STATES PATENTS

| | | |
|---|---|---|
| 3,175,247 | 3/1965 | Morrison et al. .................... 118/405 |
| 3,288,583 | 11/1966 | Sheldon ............................. 65/11 W |
| 3,410,672 | 11/1968 | Lazocte ........................... 65/11 W X |
| 3,504,177 | 3/1970 | Walker et al. ......................... 118/48 |
| 3,791,806 | 2/1974 | Koizami et al. ........................ 65/3 A |
| 3,840,384 | 10/1974 | Reade ................................. 118/405 |

Primary Examiner—Robert L. Lindsay, Jr.

[57] ABSTRACT

A method of coating a continuous glass fiber filament with plastic, in which plastic is charged into a vertical closed cylinder having a die opening at its lower end and an axial core tube terminating in the die opening to form an annular orifice. The plastic in liquid form is forced through the orifice by pressurized gas introduced into the upper portion of the cylinder while the glass filament is drawn continuously through the core tube.

5 Claims, 1 Drawing Figure

U.S. Patent  June 1, 1976  3,960,530

METHOD OF COATING A GLASS FIBER FILAMENT

This invention relates to a method of coating a continuous glass fiber filament with plastic.

In the field of glass fiber optics it is desirable to coat a continuous glass fiber filament with a plastic in order to strengthen the strand. At present such a coating is applied by feeding the filament from a give-up reel continuously through a re-heating oven and then through liquid plastic. The re-heating step improves the adherence of the plastic to the filament. The problem with re-heating the glass filament is that the heat cannot be applied uniformly and differential stresses occur. These stresses, added to the tensions created when the filament is drawn from the give-up reel, create strains in the filament which affect its operability as an optical device.

Another problem encountered in the known method of coating continuous glass fiber filaments is that moisture and dust contaminate the surface of the filament between the time it is drawn and the time it is coated. Also, when the glass filament is drawn it contains micro-cracks in its surface and if the filament is left to stand the micro-cracks enlarge. The surface contamination and the micro-cracks both adversely affect the adherence of the plastic coating to the filament which reduces its strength.

It is an object of the present invention to provide an improved method of coating a continuous glass fiber filament.

In its broadest aspect the invention consists of a method of coating a continuous glass fiber filament by the extrusion of plastic, comprising the steps of: charging with plastic coating material a closed vertical cylinder having a die aperture in the lower end thereof and an axial core tube terminating in the die aperture to form an annular orifice, the plastic being liquified to pass through the die orifice; drawing the filament from a source of molten glass coaxial with the core tube, continuously through the core tube; and introducing pressurized gas into the upper portion of the cylinder to force the liquified plastic through the annular orifice and onto the filament.

An example embodiment of the invention is shown in the accompanying drawing in which:

FIG. 1 is a cross-sectional view in elevation of an extruder for use in carrying out the method of the invention.

The embodiment shown in the drawing consists of an extruder 10 comprising a cylinder 12 which is vertically aligned axially with the outlet orifice of a furnace 13 for producing filaments from molten glass.

Cylinder 12 has an upper end closure 14 and a lower die closure 16 to form a chamber 18 within the cylinder. Upper end closure 14 is removably fixed to cylinder 12 by bolts 20 and has a central bore 22 which is threaded to accept a boss 24 of a core tube 26 extending axially through the cylinder. Bore 22 is sealed by a threaded nut 28 which bears against an O-ring 30 lying against an annular shoulder 32 in the bore.

Lower die closure 16 is removably fixed to cylinder 12 by bolts 34 and has a contoured aperture 36 into which the free end or nozzle 38 of core tube 26 projects to form an annular orifice 37. Nozzle 38 is removably attached to core tube 26 by set screws 39 and is shaped to act as a valve to seat in aperture 36 of closure 16 when the core tube is moved downwardly.

A circular pressure plate 40 extends across chamber 18 normal to the axis of cylinder 12 and has a central aperture 42 through which core tube 26 projects. Pressure plate 40 is free to move upwardly and downwardly in chamber 18. A support plate 44 parallel to pressure plate 40 is located adjacent lower die closure 16 with a plurality of large apertures 46.

Cylinder 12 carries two ports opening into chamber 18: a port 48 located adjacent upper end closure 14 for the introduction of gas, and a port 50 located adjacent lower die closure 16 for the introduction of liquid plastic. An annular band heater 52 circumscribes cylinder 12 between ports 48 and 50.

A level indicator rod projects through a seal 56 in upper end closure 14 and extends into chamber 18 to bear against pressure plate 40. A thermocouple 58 projects through cylinder 12 to chamber 18.

In the operation of the example embodiment, chamber 18 is opened by removing bolts 20 and lifting off upper end closure 14 together with core tube 26 and indicator rod 54. Pressure plate 40 is also removed from chamber 18 and the chamber is charged with a machined billet of solid plastic coating material, such as nylon or polypropylene, which rests against support plate 44. The billet has a central passage to receive core tube 26. Pressure plate 40 is then replaced in chamber 18 to rest on the billet below gas port 48 and upper end closure 16 is replaced on cylinder 12 with core tube 26 extending through pressure plate 40 and through the billet, and with indicator rod 54 resting on the pressure plate. Gas port 48 is connected with a source of inert gas, such as nitrogen, at constant pressure and liquid plastic port 50 is closed by suitable plug means. Boss 22 is screwed downwardly in bore 22 to have free end 38 of core tube 26 seat in die aperture 36. Band heater 52, connected to a source of electricity, is switched on to melt the billet of plastic within chamber 18. The temperature of the plastic within chamber 18 is sensed by thermocouple 58.

Extruder 10 is now ready to coat a continuous glass fiber filament 60 which is pulled from glass furnace 13 and passed through core tube 26. Boss 24 of core tube 26 is screwed upwardly to unseat nozzle 38 from die aperture and inert gas at constant pressure is introduced into chamber 18 through port 48 above pressure plate 40. The pressurized gas acts against plate 40 to force the liquified plastic out through die aperture 36 around nozzle 38 as strand 60 is passed through core tube 26, producing a plastic coating 62 on the filament. The thickness of coating 62 is governed by the position of nozzle 38 in die aperture 36, by the gas pressure and by the speed of filament 60 which attenuates the coating.

The device of the invention applies a constant pressure to the liquid plastic material which produces a uniform extrusion of the plastic onto filament 60. When using a machined billet of plastic, pressure plate 40 is not necessary but the plate minimizes gas tracking through the die. Support plate 44 is optional to seat the billet above lower end closure 16.

If desired, liquid plastic may be introduced directly into chamber 18 instead of using a machined billet of plastic. The liquid plastic is introduced by connecting port 50 with a suitable screw or ram extruder. The use of the device of the present invention in conjunction with a conventional screw extruder would smooth out the pressure fluctuations of such an extruder and provide a smooth coating of plastic on a continuous filament. The level of liquid plastic in chamber 18 using either a machined billet or a conventional extruder is sensed by indicator rod 54 which could be employed to provide feedback control for the conventional extruder.

If it is necessary to dehydrate the plastic in chamber 18 before extruding it, a vacuum can be applied to port 48 in the absence of pressure plate 40.

Because liquid plastic is a non-Newtonian fluid, shear stresses complicate its flow characteristics. The device of the present invention reduces the shear stresses applied to the plastic by conventional extruders and causes the material to behave more like a Newtonian fluid which is more predictable and hence more controllable.

By drawing glass fiber filament 60 directly from a molten source through extruder 10 the class filament is coated with plastic before the surface of the filament can become contaminated or the micro-cracks can become enlarged. Also, the residual heat of filament 60 can be employed to obtain the required bonding of plastic coating 62 to the filament. Of course extruder 10 must be spaced below glass furnace 13 a distance to allow filament 60 to cool to a temperature which will not degrade plastic coating 62. It will also be appreciated that no lateral stresses are imposed on filament 60 before it is coated.

I claim:

1. A method of coating a continuous glass fiber filament by the extrusion of plastic, comprising the steps of:
    charging with plastic coating material a closed vertical cylinder having a die aperture in the lower end thereof and an axial core tube terminating in the die aperture to form an annular orifice, the plastic being liquified to pass through the die orifice;
    drawing the filament, from a source of molten glass coaxial with the core tube, continuously through the core tube; and
    introducing pressurized gas into the upper portion of the cylinder to force the liquified plastic through the annular orifice and onto the filament.

2. A method as claimed in claim 1 in which the cylinder is charged with a billet of solid plastic and the plastic is liquified in situ.

3. A method as claimed in claim 1 in which the plastic is charged into the cylinder in liquid form adjacent the die aperture.

4. A method as claimed in claim 1 in which the plastic is nylon.

5. A method as claimed in claim 1 in which the plastic os polypropylene.

* * * * *